Figure 1:
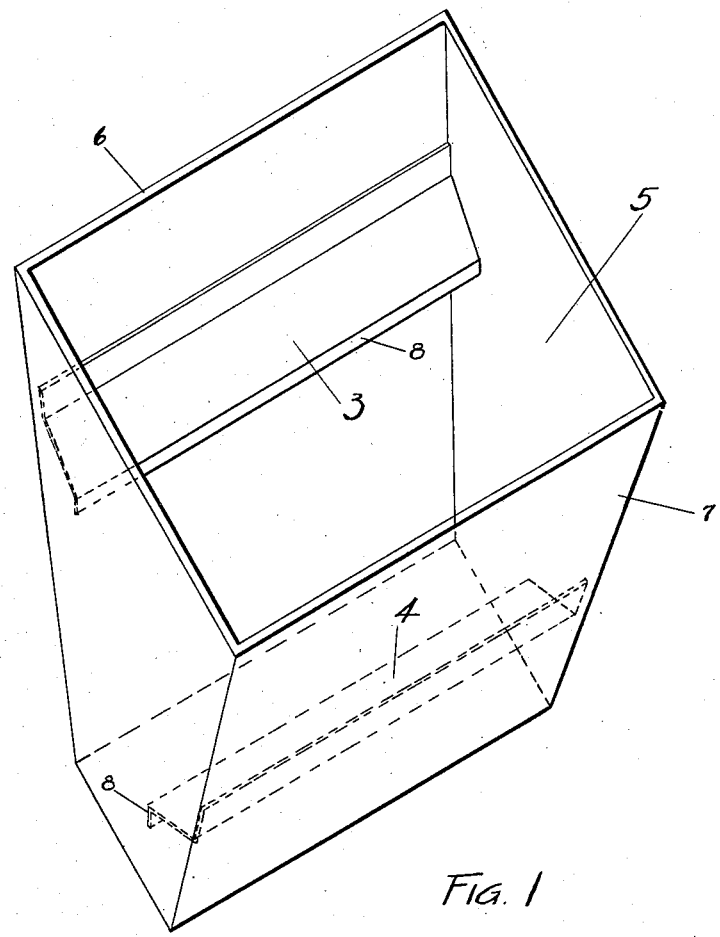

Feb. 4, 1930.　　　G. W. RYNDERS　　　1,745,716
HOPPER
Filed March 20, 1925　　2 Sheets-Sheet 1

INVENTOR
GEORGE W. RYNDERS
BY Roy M. Eilers
ATTORNEY

Feb. 4, 1930.  G. W. RYNDERS  1,745,716
HOPPER
Filed March 20, 1925   2 Sheets-Sheet 2
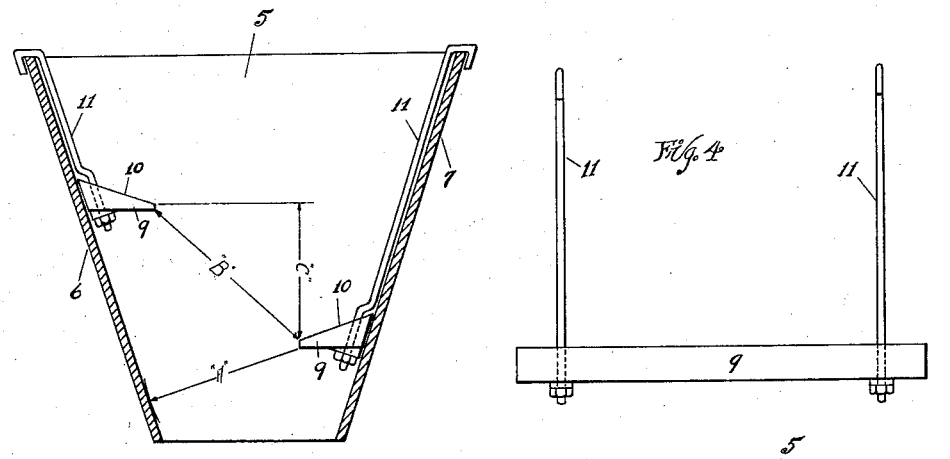
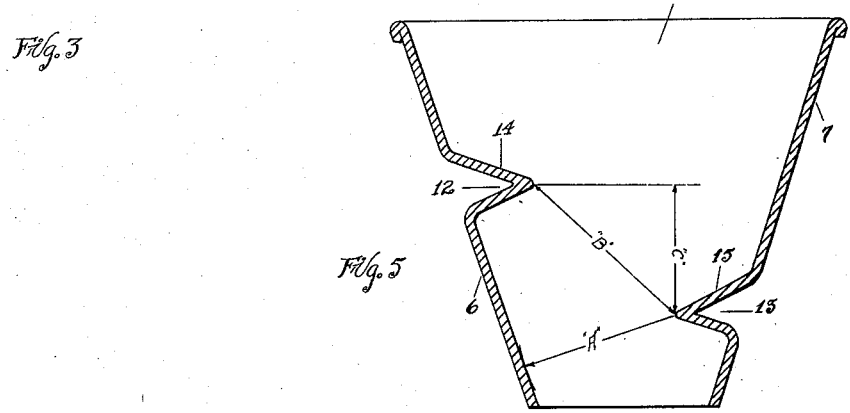
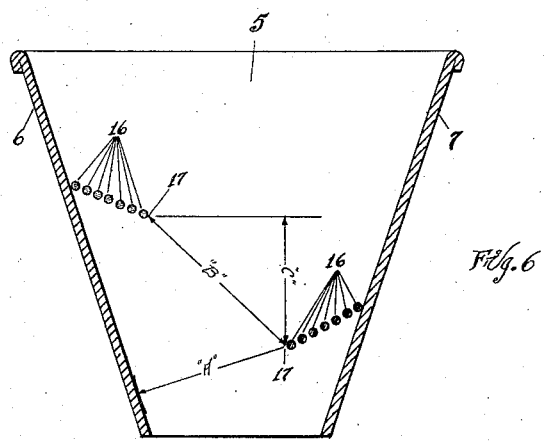
INVENTOR
*GEORGE W. RYNDERS*
BY *Roy M. Eilers*
ATTORNEY Patented Feb. 4, 1930

1,745,716

UNITED STATES PATENT OFFICE

GEORGE W. RYNDERS, OF CARPENTERSVILLE, ILLINOIS, ASSIGNOR TO FAIRBANKS, MORSE & CO., OF CHICAGO, ILLINOIS, A CORPORATION OF ILLINOIS

HOPPER

Application filed March 20, 1925. Serial No. 17,003.

My invention relates to improvements in hoppers and more particularly to improvements in hoppers to be used in conjunction with feed-mills for grinding ear corn.

When employing the ordinary form of hopper for the purpose of feeding ear corn to a grinding mill the tendency is for the corn to wedge or "bridge" in the hopper, resulting in a clogged hopper, poor or intermittent feeding, and making it necessary to employ an extra operator to keep the ear corn feeding properly. Heretofore various expedients have been employed to prevent this bridging, all of which in the form of mechanical agitators requiring gears, rods, links, etc., which add to the danger of operating the machine, are costly to manufacture and maintain, require additional power for their operation, and are only partially successful, since the agitation of the ear corn does not entirely prevent "bridging" or intermittent feeding and, in many cases, results in throwing the corn out of the hopper when operating at full capacity. It is the object of my invention to provide a hopper which will feed the ear corn to the grinder in a steady and regular manner without bridging, without tending in any way to throw the corn out of the hopper, and without the use of mechanical agitators or other devices requiring additional power for their operation.

Another object of my invention is to provide a hopper for accomplishing the above results which is economical to manufacture and maintain and which does not add to the danger of operating the grinder.

Further objects and advantages of my invention will appear from the following drawings and description thereof.

Though my invention consists largely in the construction and arrangement of parts hereinafter described and particularly pointed out in the claims, yet I do not limit my invention to the precise form or construction of parts shown or the several parts thereof, inasmuch as various alterations may be made without changing the scope of my invention.

This bridging action of ear corn is due to the super-imposed weight of the corn in the upper part of the hopper upon the corn in the lower part of the hopper, the bridging action becoming less in an ordinary or simple hopper as the level of the corn in the hopper becomes lower. By introducing means in the hopper for relieving the lower layers of corn of this super-inforced weight I prevent the bridging of the corn and provide a hopper which feeds the corn evenly and steadily to the grinder. As a means for relieving this super-imposed weight I prefer to employ a baffle or a plurality of baffles such as those shown at 3 and 4 in Figs. 1 and 2, positioned within a hopper 5, which may be of any suitable size and shape, here shown as having a top of rectangular shape with two of its opposite sides sloping to form a bottom having a rectangular shape. The number of these baffles employed depends upon the vertical height of the hopper employed and, to some extent, upon the size of the ear corn to be handled and while I show, in Figs. 1 and 2, two of these baffles I do not wish to be limited to the use of any number of baffles. I have found that in most cases one such baffle will effectively prevent this bridging action in hoppers of the ordinary size and when corn of average length is being ground. By employing two baffles in such a hopper, however, I find that a more even flow of corn through the hopper results. The baffles 3 and 4 are preferably carried by the sloping sides 6 and 7, respectively, of hopper 5 and they may be attached thereto in any suitable manner such as by bolting, welding or the like. It is evident that these baffles, materially strengthen the hopper itself and add to its useful life.

I prefer to form these baffles with a turned-over portion 8 so as to materially strengthen their construction. The relative dimensions and position of these baffles, both with respect to each other, when more than one baffle is employed, and with respect to the dimensions of the hopper, are very important and depend upon the dimensions of the material to be ground. For example, I have found that the perpendicular distance from the lower edge of the portion 8 of the lowest baffle 4 to the plane of the opposite side of the hopper, here shown as side 6, and which dimension I shall designate as dimension "A," should be approximately equal to or greater than the longest ears of corn to be ground. When more than one baffle is used, the distance from the upper edge of the portion 8 of one baffle to the lower edge of the portion 8 of the next higher baffle, which dimension I shall designate as dimension "B," should be approximately equal to or greater than the longest ears of corn to be ground. It will be evident that the turned-over portions 8 are not essential to my invention and in cases where such portions 8 are not employed I designate dimension "A" as the perpendicular distance between the innermost edge of the bottom baffle and the plane of the opposite side of the hopper, otherwise stated, it is the shortest distance between any given member or baffle, and the opposite side of the hopper, and the dimension "B" as the shortest distance between opposed members or baffles, or the distance between the innermost edge of one baffle and the innermost edge of the next higher baffle. When grinding the average run of corn which, I have found, normally has a length of from 9 to 9½ inches, hoppers and baffles having the dimensions A and B between 10 and 12 inches have proven to be very efficient in preventing bridging and in giving a regular flow of corn.

When more than one baffle is employed I have found that the vertical distance between one baffle and the next higher baffle should be equal to or greater than the largest diameter of the largest corn to be ground. This dimension I shall call dimension "C" and designate it as the vertical distance between the innermost edge of one baffle and the innermost edge of the next highest baffle. I have found that under ordinary conditions this dimension should not be less than 2½ inches.

In employing a plurality of baffles the baffles are preferably alternately attached to opposite sides of the hopper, the sloping sides of the hopper being the ones preferably employed.

I prefer to form my baffles with a downward slope with respect to the horizontal giving an angle of inclination, which would be the angle between the plane of the baffle and the horizontal, and I have found that this angle of inclination is important in obtaining efficient results since the greater this angle the less efficient the baffle becomes to prevent bridging. It would appear that this angle of inclination should only be such as to prevent any material form lodging on the baffle, and should not be greater than thirty degrees with the best results at 10 degrees for the majority of cases.

Figure 2:
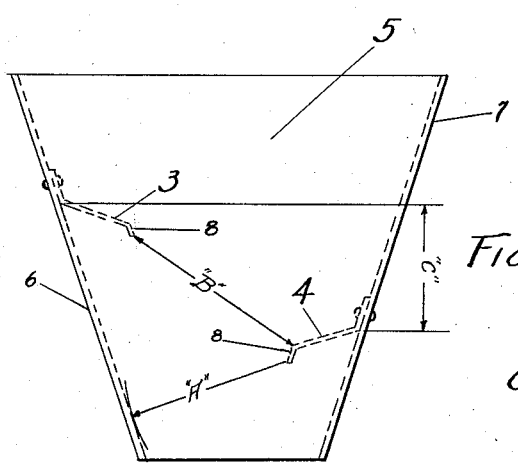

By decreasing the height of the hopper it will be evident that the upper baffle shown in Figs. 1 and 2 may be omitted and, conversely, by increasing the height of the hopper additional baffles would be added in accordance with the dimension "C" discussed above. I have found, however, that with the average ear corn the most efficient results are obtained with a two baffle arrangement as shown in Figs. 1 and 2, and that decreasing the height of the hopper materially decreases its capacity making more frequent replenishments necessary. The width of the baffles is evidently more or less fixed by the dimensions "A," "B," "C," the angle of inclination given above, and the dimensions of the hopper, such as the height, flare, etc. So long as the dimensions A and B are not less than the length of the ear corn to be ground the flare of the hopper may be increased to any desirable value, since the dimensions A and B may be increased above the minimum set and still afford a steady and efficient feed without bridging.

In Figs. 3 and 4 I show a modified form of my invention in which the baffles are formed by members 9 preferably having their upper surfaces 10 sloping so as to give the desired angle of inclination. The members 9 are preferably held in place by means of rods 11 fastened into the members at either end in any suitable manner. These rods may be made with a hook at one end, as shown, so as to hook over the edge of the hopper 5, and are formed in suitable lengths so as to position the members 9 within the hopper to give the desired values of dimensions A, B and C as given above. The ends 12 of members 9 may be formed with a slope, as shown, in order that this member may fit snugly against the sides of hopper 5.

In Fig. 5 I show another modified form of my invention in which baffles are formed by indentations 12 and 13 in the sides 6 and 7, respectively, of hopper 5. These indentations 12 and 13 are preferably formed so as to have sloping surfaces 14 and 15 in order to give the desired angle of inclination and are so positioned in the sides of the hopper that they will meet the requirements of dimensions A, B and C given above.

While I show my baffles as being formed with continuous surfaces it is evident that these baffles may be formed with perforated surfaces or that the baffles may be formed by an arrangement of rods fastened between the ends of the hopper. Such an arrangement of rods is shown in section in Fig. 6 which also shows how the dimensions A, B and C would be determined. The innermost edge of the baffle thus formed by the rods 16 would evidently be the inner edge 17 of the inner rods. These rods 16 may be attached to the ends of the hopper 5 in any suitable manner such as by bolting, etc. A number of ways of constructing my baffles, other than those shown here will be evident to those skilled in the art and I do not wish to be limited to any particular form of construction or arrangement since any type of baffle may be employed without departing from the scope of my invention.

I claim:

1. In a hopper adapted to prevent bridging, the combination of a plurality of members above a grinder, horizontally and vertically relatively widely spaced and so positioned as to provide a relatively wide vertical passageway therebetween, said members being adapted to support a substantial portion of the hopper contents, and so separated from each other that an ear of corn will not normally rest upon two inclined members.

2. In a hopper adapted to prevent bridging, the combination of a plurality of baffles above a grinder, horizontally and vertically relatively widely spaced, and so positioned as to provide a relatively wide vertical passageway therebetween, said baffles being adapted to support a substantial portion of the hopper contents, and so separated from each other that an ear of corn will not normally rest upon two inclined baffles.

3. In a machine for grinding ear corn, in combination, a hopper having opposed sides, and a plurality of baffles positioned on the opposed sides of said hopper, the inner edges of said baffles being vertically and horizontally relatively widely spaced from each other and from the opposite sides of said hopper so that an ear of corn will not normally bridge from one baffle to another or from one baffle to the opposite side of said hopper.

4. In a hopper adapted to contain ear corn and to prevent bridging, a plurality of baffles located on the opposed sides of said hopper, said baffles being relatively widely spaced vertically and horizontally, the lower baffle being substantially equally spaced from the upper baffle and from the opposite side of the hopper, the vertical spacing of the baffles being not substantially less than one fourth of the horizontal spacing of the same so that normally an ear of corn will not bridge said baffles.

GEORGE W. RYNDERS.